June 14, 1960     R. H. ENGELMANN     2,941,118
VANE ACTUATING CIRCUITRY FOR AUTOMATIC HEADLIGHTING SYSTEM
Filed Oct. 27, 1959     5 Sheets-Sheet 1

INVENTOR.
RICHARD H. ENGELMANN
BY
Charles M. Hogan
ATTORNEY.

United States Patent Office 2,941,118
Patented June 14, 1960

2,941,118

VANE ACTUATING CIRCUITRY FOR AUTOMATIC HEADLIGHTING SYSTEM

Richard H. Engelmann, Cincinnati, Ohio, assignor to J. Page Hayden, Cincinnati, Ohio Filed Oct. 27, 1959, Ser. No. 849,090

11 Claims. (Cl. 315—82)

The present invention relates to headlight control systems generally and specifically to improvements in the basic Bone-type of control system illustrated in United States Patents Nos. 2,562,258 and 2,753,487, issued to Evan P. Bone and assigned to J. Page Hayden of Cincinnati, Ohio.

The Bone headlight control system is an electrical and optical installation in an automobile (i.e. equipped vehicle) which so functions that a non-glare shadow automatically is cast on the zone of an oncoming vehicle, as the passing approach is made, in order to protect its operator from disability and discomfort glare. The Bone system functions in such a way that light of such intensity as to effect greatly improved night visibility for the driver of the equipped vehicle is projected onto the right side of the road in front of the equipped vehicle throughout the approach. As the approaching vehicles finish passing each other the light is projected down the road centrally.

The system is premised generally on a direction finder including photoelectric means for detecting the presence of an oncoming vehicle, in combination with a direction-finder vane which is positioned in azimuth, under the ultimate control of the photoelectric means, to measure the direction of approach of the oncoming vehicle (specifically, the relative bearing of the left or inner headlamp of the approaching vehicle, "inner" meaning closer to the center line of the highway). Synchronized with the direction-finder vane are vanes in the head lamps which function in such a way as to define the projection of light and to cause overlapping shadows or non-glare areas to track the approaching vehicle until it passes or comes alongside the equipped car, all as described in detail in the aforementioned Bone patents.

Improved systems of this character are described in the following United States patent applications, assigned to the same assignee as the present application and invention, and reference is made to such applications for a detailed description of such improvements, both as to structure and mode of operation:

Richard H. Engelmann (hereinafter referred to as Engelmann I), S.N. 715,973

Richard H. Engelmann and Frank M. Foster, S. N. 715,875 both filed in the United States Patent Office on February 18, 1958. These patent applications issued as U.S. Patents Nos. 2,917,663 and 2,917,666, respectively, on December 15, 1959.

Figure 1:
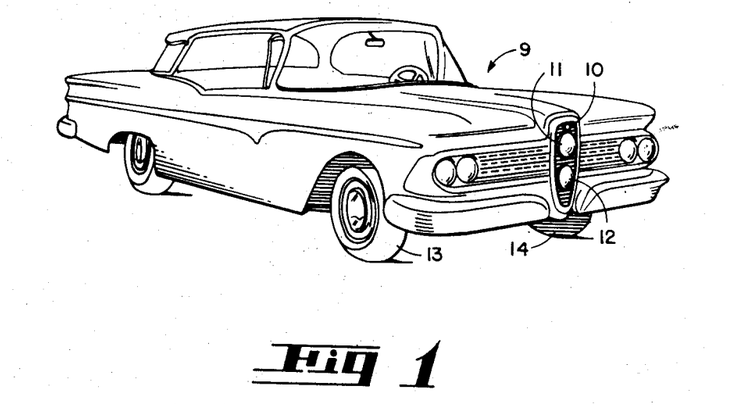
Fig. 1 is a perspective view of an automobile in which there is installed an improved headlight system in which the invention is used.
Figure 2:
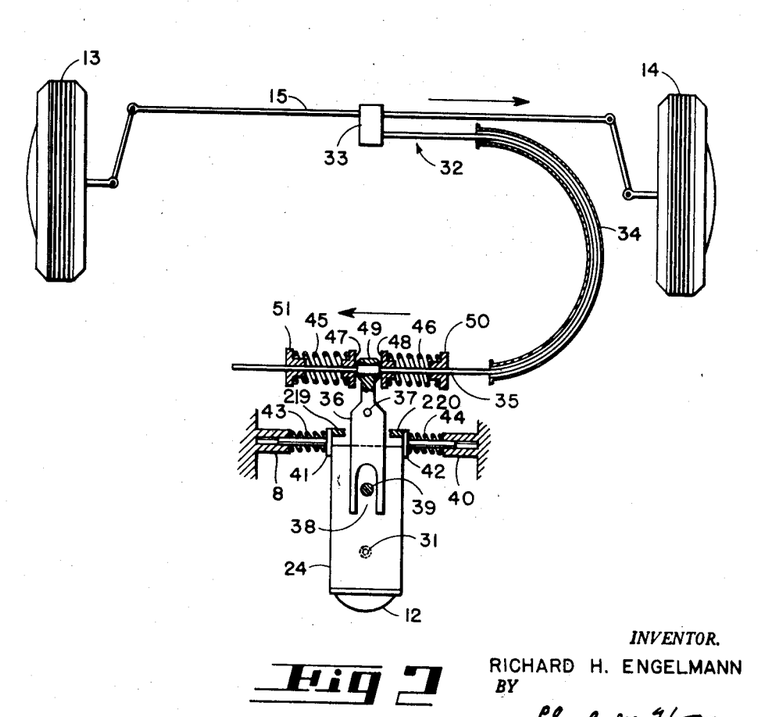
Fig. 2 is a schematic outline view of a suitable mechanism for coordinating the movements of the steering linkage of the automobile and the supporting framework for the automatic headlight control system of Fig. 1.
Figure 3:
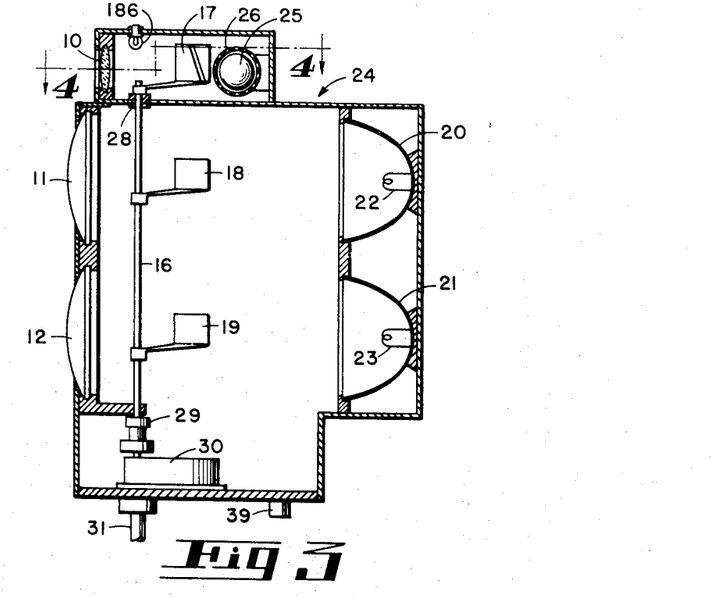
Fig. 3 is a sectional view taken on line 3—3 of Fig. 4, looking in the direction of the arrows, showing a combination of direction finder, head lamps, and mechanical synchronizing means in which the invention is used.

In the co-pending patent application of Thomas E. Dugle, Serial No. 849,022, assigned to the assignee of the present application and invention, filed in the United States Patent Office contemporaneously herewith and entitled "Mechanically Steerable and Electronically Automatic Headlighting System" hereinafter referred to as "Dugle," there is shown an improved Bone-type headlighting system in which the direction finder and headlamp vanes are carried in synchronism by the same shaft and in which the supporting framework for the headlamps and direction finder is steered with the car. The embodiment of the present invention herein shown is disclosed in conjunction with the Dugle invention, but is not limited to utility therewith. Reference is made to Figs. 1–3 of the present application and to said co-pending Dugle patent application for a complete description of an improved Bone-type system in which improved circuitry in accordance with the invention is particularly useful. Subject matter disclosed but not claimed herein is claimed in said co-pending patent application of Dugle.

The present invention is directed to a principal objective of providing improved stability and response speed of the vane-driving circuitry (i.e. the circuitry between the output tubes 123—124 and the armature coil 148 of the motor or actuator for the vanes).

Specifically, one object of the invention is to provide a non-linear impedance (such as 149) in the output circuitry of these tubes. This impedance, here shown in the form of a tungsten light bulb, reconciles the requirements of damping and fast response of the vane-driving system because the resistance of the bulb is high and provides low damping upon the initial appearance of a signal at the phototube (25). On the other hand, when the system is tracking (i.e. following an oncoming car), heavy damping is desired. During that condition, the resistance of the lamp is low and the voltages across it are low, so that by the provision of the non-linear impedance 149 the apparently inconsistent requirements of damping and fast response are reconciled.

It is also an object of the invention to provide in the above-mentioned output circuit an inductance (such as 150) which is so proportioned as to dissipate current through the coil 148 to aid instantaneous reversals of the vanes.

Another object of the present invention is to simplify the selector-flashing-searching circuitry disclosed in Engelmann-Foster. In accordance with the present invention the flashing relay of Engelmann-Foster is dispensed with and the flashing function is controlled by contacts (such as 174) included in the sensing relay. A major simplification is accomplished by providing an arrangement in which searching, flashing and the automatic selection of the appropriate one of those two functions are accomplished by only two relays and associated circuitry.

A further object of the invention is to provide a bulb (such as 186) which is operative, at the will of the driver of an equipped vehicle, to simulate the approach of an oncoming car and to affect the phototube (25) in a manner similar to an oncoming headlight, thereby to cause the direction finder and headlamp vanes to assume the search position. In other words, the system is manually caused to assume the search condition by "making it think" that an oncoming headlight is approaching. The operation of this bulb is controlled by contacts such as 209 in the search relay.

A further object of the present invention is to provide contacts controlled by the sensing relay to permit the tracking circuits to operate only when the sensing relay has been energized.

For a better understanding of the present invention, together with other and further objects, advantages and capabilities thereof, reference is made to the following description of the accompanying drawings, in which.

Before proceeding with the description of the mechanical elements of the headlighting system, reference will first be made to Fig. 6 and particularly to the output tubes 123 and 124. Conduction in tube 124 causes the headlamp and direction finder vanes to be driven counterclockwise while conduction in tube 123 causes them to be driven clockwise. In normal tracking operation, the vanes are positioned as a consequence of the composite action of both tubes, and the circuitry here provided improves the stability and speed of response of the vane-driving system. The composite of the output currents of the tubes 123 and 124 flows through an armature coil 148 and it is the flow of this current which causes the direction finder and headlamp vanes to be appropriately positioned.

Figure 6:
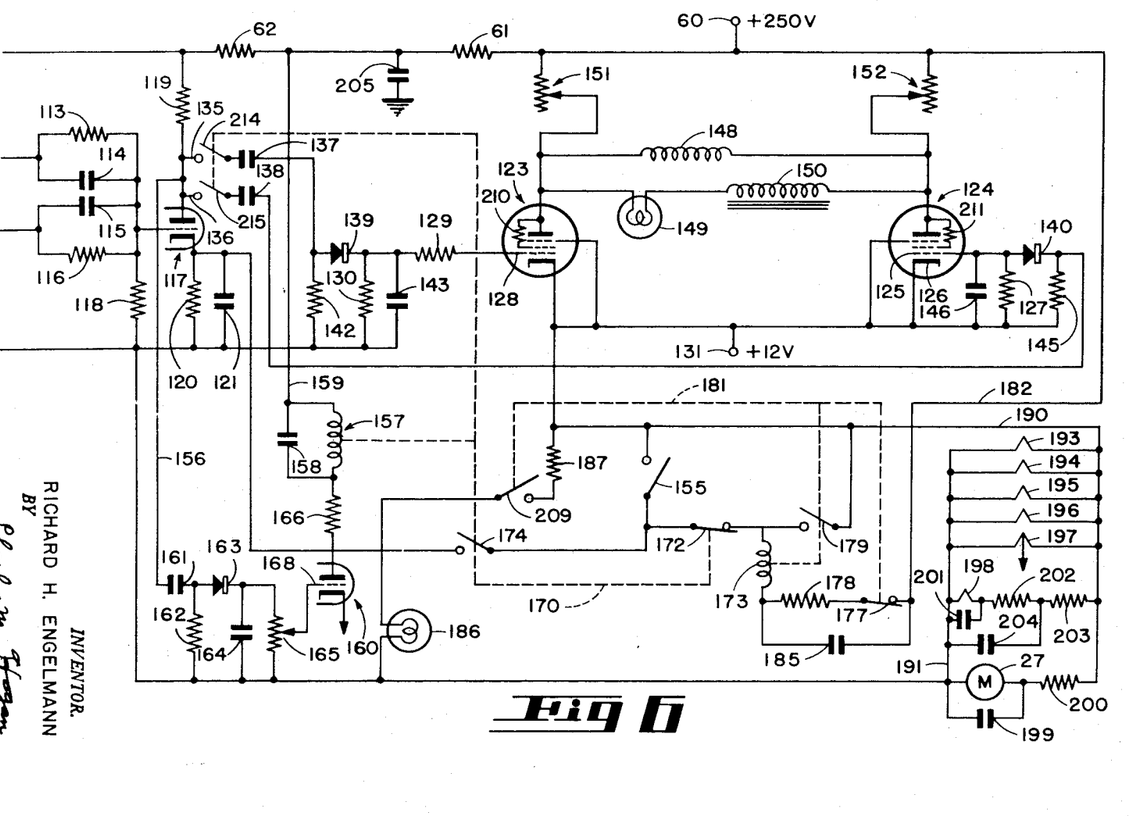

General reference is now made to the sensing relay 157 and the search relay 173 in Fig. 6 and their associated circuits and contacts. These cause the searching and flashing functions to be performed, together with the automatic selection of that one of the functions which is appropriate to road conditions.

Attention is further directed in a preliminary manner to bulb 186 (Figs. 3 and 6), the function of which is to simulate an approaching or oncoming headlight and to cause the searching operation to be performed.

Contacts 214—215 (Fig. 6) are closed by the sensing relay and that relay must be energized before the system tracks.

Having made reference to these major features of the invention in a general manner, the description now proceeds to the mechanical system with which it is employed, it being understood that most of the subject matter of Figs. 1–3 hereof is disclosed and claimed in the above-mentioned Dugle patent application.

In Fig. 1 there is shown in perspective an automobile generally indicated by the reference numeral 9. In the frontal portion of the hood of this automobile is installed a headlight system, including a direction finder lens 10 and headlight lenses 11 and 12, vertically aligned with the direction finder lens 10 on top. This vehicle has conventional steerable front wheels 13 and 14 and the wheels are angularly positioned for turning of the vehicle by a conventional linkage indicated by the reference numeral 15, as shown in Fig. 2.

Figure 4:
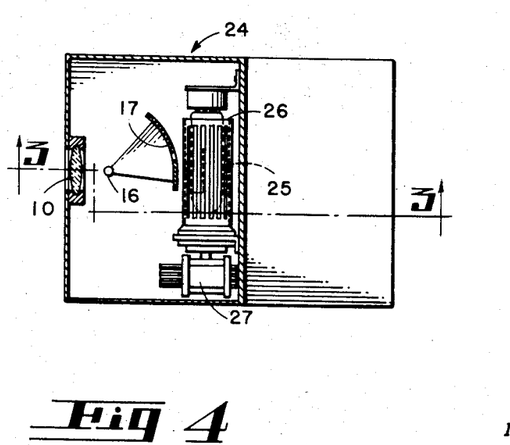
Fig. 4 is a sectional view taken on line 4—4 of Fig. 3, and looking in the direction of the arrows.

Referring now to Figs. 3 and 4, there is provided a mechanical ganging means or shaft 16 to which are secured, for synchronized rotation therewith, the direction finder vane 17 and the head lamp vanes 18 and 19 (Fig. 3). The lenses 10, 11 and 12 and the head lamp reflectors 20 and 21, each including a filament 22 or 23, are suitably positioned and mounted in a casing generally indicated by the reference numeral 24, and this casing constitutes the supporting framework of the system. The supporting framework 24 is mechanically turned and coordinated with the steering linkage 15 through the linkage illustrated in Fig. 2. It will be understood that, in operation, the direction finder vane 17 measures the bearing of and follows or tracks an oncoming vehicle and the synchronized head lamp vanes 18 and 19 cast overlapping Bone-type non-glare shadows on the zone of such oncoming car, while allowing greatly enhanced lighting on the right side of and down the road, so far as the driver of the equipped vehicle is concerned. When the motor vehicle executes a large angle turning movement, then the supporting framework 24 is mechanically turned in the direction of such movement but to a lesser angular degree.

In Figs. 3 and 4 there is shown a phototube 25 which receives radiant energy from light sources, as for example, the inner head lamp of an oncoming vehicle. Such radiant energy is in the form of pulses of light, the phototube 25 of the present application corresponding to phototube 13 shown in the United States patent of Harold J. Behm and William Hecox, No. 2,878,396, issued March 17, 1959, entitled "Direction Finder for Automobile Headlighting System" and assigned to the same assignee as the present application and invention. In accordance with the Behm and Hecox patent, there is concentrically mounted for rotation about the phototube a discriminator cylinder 26, driven by a motor 27. This cylinder is formed with alternate light-admitting and light-rejecting portions in such a way that it, in combination with phototube 25, discriminates against large areas of light and foreground light and causes the system to respond only to point sources of light in the optical field of direction finder lens 10. Reference is made to the Behm and Hecox patent for a complete description of the mode and manner in which such discrimination is accomplished. The details of the direction finder vane 17 are shown in Bone Patent 2,753,487.

Shaft 16 is provided with suitable bearings 28 and 29, and is mechanically coupled to the output shaft of electromagnetic means or motor 30, secured to casing 24. Means 30 is essentially a D.C. motor with a permanent magnet field and an armature winding 148. Angular movement of the armature is limited by stops 60 degrees apart.

The entire supporting framework or mounting 24 is rigidly secured to, for rotation with, a shaft 31, and this rotation is controlled by the steering linkage 15 through the mechanism illustrated in Fig. 2. Fig. 2 shows element 24 symbolically.

Referring now to Fig. 2, there is shown the shaft 31 which is rotatably journaled on the frame of the car in such a way that casing 24 is mounted for controlled angular motion relative to said frame. A push-pull control cable 32 is connected by block 33 to the linkage 15 and given a reverse bend by threading it through rigid tubing 34 in such a way that its end moves linearly to the left as the car executes a right turn, and conversely. A right turn will be assumed in this discussion. Push pull-control cable 32 exerts a turning movement relative to a link 36 which is pivoted at 37 on the framework of the vehicle. Link 36 is formed with bifurcations to provide a lost motion clearance opening 38 so that linkage 36 is actuated to go through a small counterclockwise movement before one of the bifurcations abuts against projection 39 on casing 24 and causes the casing 24 to turn clockwise, in coordination with the aforementioned right turn.

The bifurcations are symmetrically spaced from the projection 39, formed on casing 24, so that the same lost motion occurs through the first phase of a left turning movement of the vehicle wheels. Thus it will be seen that there is lost motion between the steering linkage and the initiation of the angular movement of the casing 24. The steering linkage 15 can continue to be actuated after the angular motion of the casing 24 has ceased. To this end, there are associated with the casing limit stops 8 and 40, each provided with spring biased plungers 41 and 42, respectively, the springs being shown at 43 and 44. When the heads of the plungers abut against their respective limit stops, the angular motion of the casing 24 ceases but the motion of the cable continues. To provide for this operation, cable 32 does not drive link 36 directly but this drive is accomplished through over-travel yield springs 45 and 46, which bias bushings or followers 47 and 48, respectively, against a cylindrically formed section 49 of link 36. The two bushings and the cylindrical portion are secured in slidable relationship to the straight or shaft portion of flexible cable 32, to the left of point 35. Rigidly secured to the shaft portion of the cable are thrust elements 50 and 51 which impart through the bias springs 46 and 45, respectively, to the bushings 48 and 47, respectively, a linear thrust and cause link 36 to turn. But after the turning motion of the link 36 has ceased, due to the abutment of elements 42 or 41 against the limit stops 40 or 8, respectively, the compression of springs 46 and 45, respectively, permits continued motion of the cable 32.

That section of the shaft portion of cable 32 which slides immediately within section 49 is enlarged to provide thrust shoulders for the bushings, in such a way that springs 46 and 47 can be preloaded to provide positive action of element 49.

The steering and headlamp linkages may be so proportioned that, after the lost motion has been taken up, the rate of angular motion of the headlamp and direction finder supporting framework may be greater or lesser than or equal to that of the front wheels.

The lengths of the springs 46 and 45 and the spacing between the elements 50 and 48 and the elements 47 and 51 are such as to permit complete freedom of operation of the steering mechanism for the wheels 13 and 14.

The lost motion clearance illustrated at 38 allows the driving wheels to move from road shock without disturbing the operation of the automatic headlamp control system. It will be understood that the springs 46 and 45 are sufficiently strong to override the springs 44 and 43. Stops 219 and 220 limit movement of plungers 41 and 42 toward each other to center casing 24. These stops are fixed to the frame of the car.

The description now proceeds to the improved electrical circuitry provided in accordance with the present invention, with particular emphasis on the features generally pointed out above.

Operating voltage for the phototube is supplied from a high voltage terminal 60 (at plus 250 volts, for example, Fig. 6), and between such terminal and ground are serially arranged voltage divider resistors 61 (10,000 ohms), 62 (10,000 ohms), 63 (10,000 ohms, Fig. 5), 64 (6,800 ohms), a parallel combination of inductance 65 (100 microhenries) and capacitor 66 (0.1 microfarad), resistor 67 (1 megohm) and resistor 68 (1 megohm). A filter network is made up of resistor 68 and a shunt capacitor 69 (0.05 microfarad) and their junction is connected through phototube load resistor 70 (10 megohms) to the anode of photocell 25 (type 918), the junction of such resistor 70 and anode being in turn connected to the grid of the first stage 71 of an amplifier twin triode (type 6J6). Due to the fact that the light of the phototube 25 is in pulses, an alternating voltage appears at the grid of this first stage, which includes cathode resistance 89 (1000 ohms) and 73 (62,000 ohms), and is arranged as a cathode follower.

Figure 5:
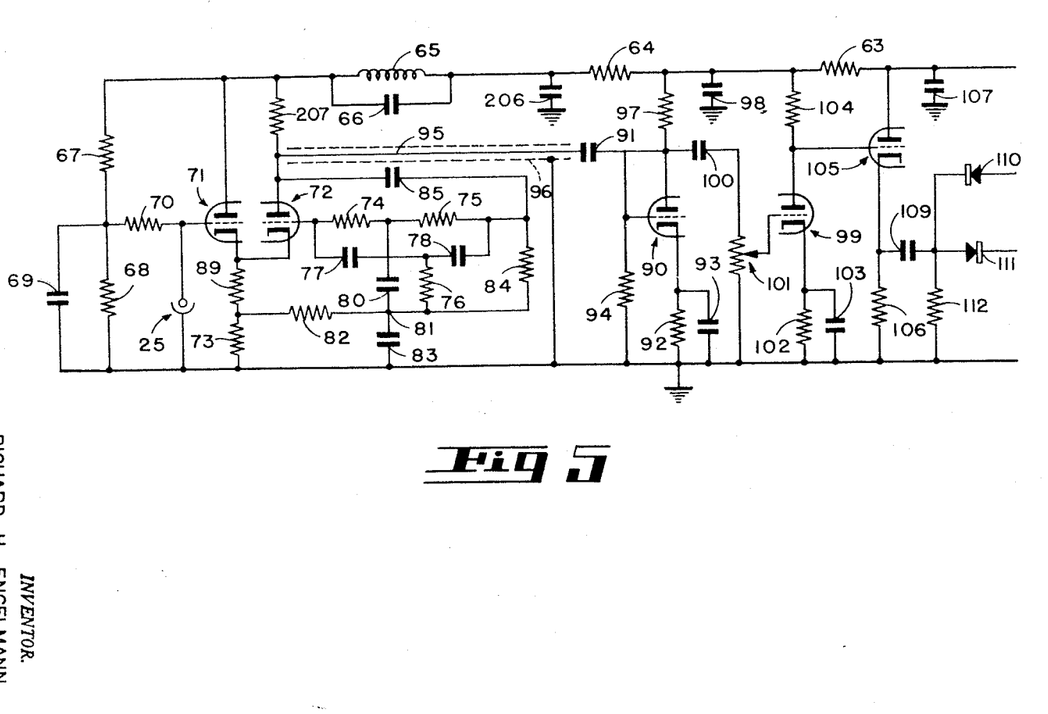
Figs. 5 and 6 are circuit diagrams which in composite illustrate complete electronic circuitry, embodying the invention, for driving the Figs. 3–4 shaft and vanes.

The output of this first stage is coupled by direct connection of its cathode to the cathode of the second stage 72, utilizing the same twin triode tube. Between plate and grid of the second amplifier stage is a parallel T network of the type shown at page 265, Figs. 8–46 of the text "Basic Automatic Control Theory," Murphy, Van Nostrand, New York, 1957. It comprises resistor 74 (330,000 ohms), resistor 75 (330,000 ohms), resistor 76 (165,000 ohms), capacitor 77 (300 micromicrofarads), capacitor 78 (300 micromicrofarads), and capacitor 80 (600 micromicrofarads). Point 81 is at A.C. ground and the junction of resistors 89 and 73 is isolated from that point by a resistor 82 (470,000 ohms) and that point is grounded by capacitor 83 (0.01 microfarad). Point 81 is connected to the junction of elements 75 and 78 by a resistance 84 (470,000 ohms) and the last-mentioned junction is coupled to the anode of stage 72 by a capacitor 85 (0.01 microfarad). This circuitry between anode and grid of stage 72 comprises well-known negative feedback circuitry as described in the aforementioned Murphy text. The parameters illustrated herein, although not limiting, are so chosen that there is no negative feedback at the desired signal frequency, which approximates the 1600 cycle chopper output signal frequency of the phototube as shown in the Behm and Hecox patent cited above.

Stage 72 is A.C. decoupled from terminal 60 by series resistor 64 (10,000 ohms) and capacitor 206 (50 microfarads) and a tuned circuit 65, 66. The tuned circuit comprises an inductance 65 and capacitor 66 which form a high impedance for power supply ripple. Amplifier stage 72 is coupled to the amplifier stage 90 of a twin triode tube (Type 12AX7) through a coupling capacitor 91 (.001 microfarad). Stage 90 has the usual cathode resistor 92 (2700 ohms) and by-pass capacitor 93 (2 microfarads) and grid resistor 94 (1 megohm). Conductor 95 is shielded by a grounded shield 96 in order to minimize stray pickup. Stage 90 is A.C. decoupled from the high voltage terminal 60 by a network comprising series resistor 63 (10,000 ohms) and shunt capacitor 98 (10 microfarads). The anodes of stages 90 and 99 are supplied with D.C. voltage via resistors 97 and 104 (each 330,000 ohms). Stage 90 is in turn coupled to amplifier stage 99 by a coupling capacitor 100 (0.001 microfarad) and potentiometer 101 (1 megohm maximum). Stage 99 has the usual cathode resistor 102 (3300 ohms) and by-pass capacitor 103 (2 microfarads) and is decoupled from the high voltage power supply by series resistor 63 (100,000 ohms) and shunt capacitor 98 (10 microfarads). Stage 99 is directly coupled to the first section 105 of a twin triode (Type 12AX7), which section has a cathode resistor 106 (100,000 ohms) and an anode voltage connection. Stage 105 is A.C. decoupled from the high voltage power supply by capacitor 107 (10 microfarads) and series resistor 62. The cathode output circuit of stage 105 is coupled, via series coupling capacitor 109 (0.5 microfarad) and shunt resistor 112 (100,000 ohms) to a time dependent non-linear compensating network. Several such networks are known in the art. That here shown for purposes of illustration is described in the literature. It comprises a pair of oppositely-poled rectifier branch circuits including diodes 110 and 111 (each type 1N67, Fig. 5) each in series with parallel resistance-capacitance networks, such networks being designated by the reference numerals 113—114, and 115—116 (the values of the resistors in the network being 470,000 ohms each and the values of the capacitors in the network being 0.01 microfarad each). The output of such compensating network is coupled to the grid circuit of amplifier stage 117 by direct coupling including shunt resistance 118 (10,000 ohms). Amplifier stage 117 includes plate supply resistor 119 (33,000 ohms) and cathode resistor 120 (1500 ohms) by-passed by capacitor 121 (4 microfarads). Stage 117 includes one-half of a type 12AX7 tube.

The over-all normal operation of the circuitry so far described in detail, i.e. phototube 25 and stages in cascade therewith, is that there is produced at the output circuit of stage 117 an alternating wave signal which is used to control the remainder of the Fig. 6 circuitry to drive the direction finder and headlamp vanes in such a direction that the direction finder vane 17 tends to cut off the passage of light to the phototube. In normal tracking operation, a balance is attained, such that the position of the direction finder vane 17 indicates the azimuth of the oncoming headlight.

Let us now consider the operations of the Figs. 5–6 system:

When the system is turned on and the power supply connected thereto, the circuitry automatically operates to place the direction finder vane 17 in the counterclockwise position. This is the position in which the headlamp vanes cast no shadow down the road.

Output tubes 123 and 124 (Type 12BK5) have their anodes connected in opposition to the coil 148, current in which drives the vane shaft actuator or motor 30. Coil 148 is the armature winding of motor or galvanometer 30.

Tube 124 is arranged to be normally conductive when the power is turned on. During automatic operation or tracking an increment of current in tube 124 tends to cause the vanes to be driven counterclockwise, or toward what is referred to as the "flash" position in the aforementioned Engelmann-Foster patent application. An increment of current in tube 123, on the other hand, causes the vanes to be driven clockwise. Tube 124 is rendered normally conductive by the return of its grid 125 to its cathode 126 via a rectifier load resistor 127 (1 megohm). Tube 123 is rendered normally of lower conductivity by the return of its grid 128, via series resistor 129 (150,000 ohms) and rectifier load resistor 130 (1 megohm) to ground. The cathodes of both tubes 123 and 124 are placed at a potential above ground by connection to a positive terminal 131 (at plus 12 volts, for example). It will be seen from the foregoing that as the output from amplifier stage 117 causes greater positive voltages to be produced across resistor 130, and greater negative voltages to be produced across resistor 127, tube 123 will become more conductive and tube 124 less conductive so that the supplemental and cooperative effect of both output tubes is to drive the vanes clockwise. Conversely, as the output signal from amplifier stage 117 decreases in intensity, the positive voltage across resistor 130 and the negative voltage across resistor 127 decrease so that then the concurrent and cooperative operation of both output tubes drives the vanes in the counterclockwise direction.

The over-all operation of the system will be apparent in the light of the above description. When the headlights of an approaching car are in the direction finder's field of view, the image of this car's inner headlight is formed by the lens 10 (Figs. 3 and 4). This image is appropriately focused. When the light from this image falls on the phototube 25, the electrical system drives the vanes clockwise toward the spot of light. As soon as the finder vane 17 reaches the light spot, it cuts off light to the phototube 25. The amplifying system now drives the vanes counterclockwise but before the vanes have moved any appreciable distance the phototube 25 again receives light. This reverses the direction of the drive on the vane. The result is that the direction finder vane may oscillate very slightly at a fairly high rate, about the position of the image of an approaching headlight. Appropriate selection of components may make the vane take a position which admits a very small, but constant, part of the light, from oncoming headlamps, to the phototube 25. Thus, the direction finder vane position is an indication of the angular position or relative bearing of the headlight of an approaching car.

The headlight shadow-casting vanes 18 and 19 cast the non-glare shadows with proper angularity, by reason of the synchronism accomplished by their being mounted on the same shaft 16.

In order to perform the above described operation of tubes 123 and 124, two outputs are taken from amplifier stage 117 at 135 and 136, and are individually coupled as by coupling capacitors 137 and 138 (each 0.01 microfarad) to the rectifier networks inclusive of diodes 139 and 140 respectively (each type 1N1763). Referring to rectifier 139, its anode is connected to ground via a resistor 142 (100,000 ohms) and its cathode is connected to ground via resistor 130 (1 megohm) and shunt filter capacitor 143 (0.002 microfarad), to the end that unidirectional voltages of positive polarity are applied to the grid 128 of output tube 123 through series resistor 129.

Referring now to rectifier 140, its cathode is connected to cathode 126 via resistance 145 (100,000 ohms) and its anode is connected to the same point by rectifier load resistance 127 (1 megohm), shunted by filter capacitor 146 (0.002 microfarad), to the end that unidirectional voltages of negative polarity appear across rectifier load resistance 127 and are applied to grid 125 of output tube 124 to render it less conductive when increasing light is applied to phototube 25. The anode of rectifier 140 is connected directly to grid 125.

The anodes of the two output tubes are connected in opposition to the end terminals of the armature coil 148 of the galvanometer electromagnetic means 30 or motor which drives the vanes. This armature coil is shunted by the series combination of a non-linear impedance 149 (3 watt, 120 volt lamp) and an iron core choke 150 (Jefferson 4819.J) for a purpose described below. The output tubes are both type 12BK5, for example, and their anodes are connected to supply terminal 60 through rheostats 151 and 152, respectively (each 10,000 ohms maximum).

The terms "searching" and "flashing" are fully explained in the Englemann-Foster patent application. Flashing is an overriding operation by which the driver of an equipped car can remove the non-glare shadow from an approaching car when the operator of such approaching car either neglects or fails to dim his lights in due season. This override simply causes the vanes to be moved counterclockwise. The operation reminds a careless oncoming driver that he is supposed to dim his lights.

Now, on the other hand, the driver of the oncoming car may dim his lights at a considerable distance beyond the usual 1500 feet, for example, at which systems of this general character are usually adjusted to pick up the bright lights of oncoming cars and to start tracking. Such systems pick up on oncoming dim lights or low beams at 500 feet, for example. If the driver of an equipped car observes a car approaching on low beam, and wants the system to pick up the low beam at a distance greater than 500 feet, he can turn the vanes clockwise to the position appropriate for automatic operation by an override operation referred to as searching. The net result of the searching operation is that it enables the system to pick up on low beams at a distance substantially greater than 500 feet.

The circuitry illustrated in Fig. 6 includes overrides which cause search and flash operations, as defined in the aforementioned Engelmann-Foster patent application, to be performed, in the improved manner now described.

The closing of a foot switch 155 automatically initiates either a searching or flashing operation as road conditions require. It will be understood that for the searching operation the vanes move clockwise while for the flashing operation they move counterclockwise.

The intensity of the signal present at conductor 156, connected to the output of stage 117, depends on the nature of such conditions (i.e. whether or not an oncoming car is within pickup range), and, upon the closing of the switch 155, that signal controls the circuitry which causes the system either to flash or to search, depending upon which function the sensing relay 157 automatically selects. Searching is performed when the light signal input to phototube 25 is below a predetermined threshold value; flashing is performed when the light input to the phototube 25 is above such threshold value.

The coil of relay 157 is energized from terminal 60 via a circuit comprising line 159, the parallel combination of relay 157 and capacitor 158 (10 microfarads), resistor 166 (10,000 ohms), and the anode-cathode circuit of triode tube 160 (half of type 12AT7). Relay 157 is energized when tube 160 conducts. Tube 160 conducts when the signal applied to its grid 168 exceeds the threshold value mentioned above.

The signal output of stage 117 is applied, via line 156, and coupling capacitor 161 (0.01 microfarad) to a detector network comprising shunt resistor 162 (120,000 ohms), rectifier 163 (type 1N93), capacitor 164 (0.25 microfarad) and potentiometer 165 (1 megohm, adjustable to lesser values) to grid 168, the adjustable output contact of the potentiometer being connected to that grid.

For the purpose of sensing the intensity of light emanating from an approaching headlamp, there is provided a tube 160 in series with sensing relay 157 (only the coil of the relay being shown, for simplification). This relay is energized when tube 160 becomes conductive. The sensing relay controls, as by ganging expedient 170, a pair of contacts 172 (closed for the searching operation) and a pair of contacts 174 (closed for the flashing operation). When relay 157 is energized, depression of foot switch 155 causes the flashing operation to occur. When relay 157 is not energized, depression of that foot switch causes the searching operation to occur. Thus the sensing relay and associated contacts 172 and 174 are essentially an automatic selector.

The circuitry is so arranged that when contacts 172 are open, the searching relay 173 cannot be energized. When contacts 174 are open, the flashing function is disabled. The flashing circuitry in this system is very simple. It consists solely of a biasing circuit which originates at point 131 and can be traced through foot switch 155 and contacts 174 to the cathode of stage 117. Under conditions when contacts 174 and switch 155 are both closed, stage 117 is biased into nonconductivity and the vanes are swung counterclockwise.

Subject to the condition that contacts 172 are closed, the search relay 173 is initially energized when the foot switch 155 is depressed, through a circuit comprising the elements 182, 177, 178, 173, 172, 155 and 131. The search relay controls, via ganging expedient 181, contacts 209 (the function of which is to close a 12-volt energizing circuit to the bulb 186), contacts 179 (the function of which is to hold relay 173 closed), and contacts 177 (the function of which is to open upon initial energization of search relay 173 so that the energization of the relay continues only for a brief period determined by the value of capacitor 185).

The flashing operation will now be described. When relay 157 is energized, as by normal pickup of an oncoming car, it dictates that a flashing operation will be initiated when the foot switch 155 is closed. Sensing relay 157, by opening contacts 172, then automatically disables the search relay 173, and by closing contacts 174, the sensing relay "sets up" a 12-volt circuit which is capable of applying a cut-off bias to the cathode of stage 117. Sensing relay 157 controls the sets of contacts 172 and 174 by a suitable mechanical ganging expedient 170.

In this circuitry there is no flash relay, the sensing relay 157 opening the contacts 172 and closing the contacts 174 for flash. Under this condition of the contacts, closing of foot switch 155 applies the 12-volt bias, from terminal 131, via switch 155 and contacts 174 to the cathode of stage 117, charging capacitor 121. The switch 155 is closed only for a brief moment and then the 12-volt bias on the cathode condenser 121 of the stage 117 leaks off through resistor 120. While the bias is present, however, the stage is cut off and the vanes are accordingly driven counterclockwise to the flash position.

It is reiterated that the sensing relay has two conditions: (1) The condition prevailing after pickup on an oncoming vehicle, when it sets up the aforementioned conditions for flash; (2) before pickup, when it sets up the conditions for search.

Now let us consider how the search relay 173 operates. Assume that the sensing relay has not picked up, because of low light level. Under that set of facts, the contacts 172, controlled by the sensing relay 157, are closed and when switch 155 is closed, then relay 173 is energized via terminal 60, line 182 a normally closed set of contacts 177 controlled by the search relay, a resistor 178 (100 ohms), relay 173, the closed contacts 172, the switch 155, and terminal 131. This condition is held by contacts 179, closed when relay 173 is energized. As contacts 177 open, the energizing circuit is held by the charging current passing through condenser 185 (50 microfarads) and the holding contacts 179 while condenser 185 is partially charged and the current through relay 173 falls below the value required for keeping the relay energized. Thus the search function is timed. The current through the condenser 185 diminishes after a predetermined time and the coil 173 becomes deenergized.

In addition to the contacts 177 and 179, the search relay also controls, through a suitable ganging expedient 181, a pair of contacts 209, which are closed for the search operation, thus energizing a bulb 186 (type No. 222), and this bulb is so placed as to cast light into the field of the phototube 25, and thus to simulate an oncoming car and cause the vanes to move clockwise, assuming the correct attitude for searching. The lamp 186 is energized via contacts 209, resistance 187 (56 ohms) and terminal 131.

For a showing as to the mode of energization of the various tube filaments, reference is made to line 190 which is connected to terminal 131 and line 191 which is connected to ground. These two lines provide bus bars which energize the following parallel-connected elements: filament 193 for stages 90 and 99, filament 194 for stages 105 and 117, filament 195 for tube 123, filament 196 for tube 124, filament 197 for triode 160 (which is half of a type 12AT7 tube), filament 198 for stages 71 and 72, and motor 27 for the drive of the direction-finder discriminator cylinder. The motor is in parallel with a capacitor 199 (25 microfarads) and in series with a resistor 200 (330 ohms). Filament 198 is shunted by a capacitor 201 (1000 microfarads) and is in series with resistors 202 (8 ohms) and 203 (4 ohms). Capacitor 204 (500 microfarads) is shunted across the series combination of elements 198 and 202.

Referring now to the overall operation of the system, the direction finder vane is caused to be positioned in such a manner as to measure the relative bearing of an oncoming car that approaches within the pickup range of the system. That is to say, the point source of light (i.e. the oncoming car's head lights) actuates phototube 25 which produces an amplified signal which causes current to flow in armature coil 148 and this causes the direction finder vane to be positioned to measure such relative bearing. The direction finder vane is synchronized with the two headlamp vanes, both of which track the oncoming car and function in such a manner as to blanket it with the protective non-glare shadow, operating in such a way that the shadow stays with the car. This is the normal automatic operation. Now, in the event that the oncoming car does not dim down, then it is desirable to flash the operator thereof by depressing foot switch 155. Under the conditions assumed, the sensing relay 157 has been energized and the closing of the contact 155 causes the vanes to move counterclockwise to perform the flash operation. On the other hand, if the oncoming car is approaching at a considerable distance on down beam, automatic pickup can be hastened if the search operation is performed. This too is accomplished by depression of foot switch 155, which, under the conditions last mentioned, causes the search relay 173 to be energized, whereupon contacts 209 are closed and the bulb 186 instantaneously simulates an oncoming point light source and the light from lamp 186, impinging on phototube 25, occasions automatic operation. It will be seen that both search and flash are override conditions, ordered by the same foot switch 155, and whether the one function or the other is performed depends upon the action of sensing relay 157.

It will be understood that the circuit parameters herein given are provided by way of illustration and not of limitation. In addition to the parameters previously discussed, the following are mentioned: a 50 microfarad capacitor 206 between the junction of elements 65—66 and ground, an 82,000 ohm resistor 207 between the anode of stage 72 and the high voltage line; resistors 210 and 211 (each 100 ohms, between the anode and second grid of tubes 123 and 124, respectively). As an optional feature, normally open contacts 214 and 215, respectively, may be located in lines 135 and 136 at the output of stage 117 and connected to the ganging expedient 170 of the sensing relay 157 in such a manner that these contacts are closed only when the system picks up on an oncoming car and when the sensing relay 157 is energized. In that event, the tracking circuits would operate only when the system has picked up. That is to say, if this option is employed the sensing relay must be energized before any tracking occurs. It follows that the flashing operation can be performed in a system employing this option whenever tracking is occurring. In the circuits shown in the Engelmann-Foster patent application and in Engelmann I the system could be tracking but would still not flash if oncoming lights were not sufficiently bright.

Figure 7:
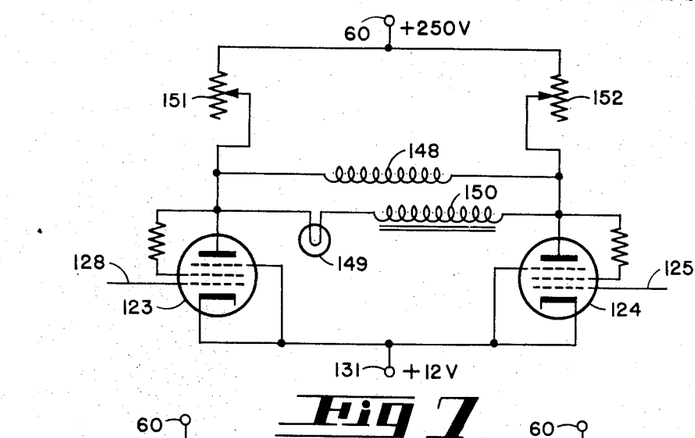
Figs. 7–11 are schematic diagrams of the output circuitry showing various phases of its operation, these diagrams being provided for purposes of facilitating the description of the operation of the output circuitry in accordance with the invention.

Referring now to Fig. 7, the operation of the armature coil 148 and lamp 149 will now be explained. It is known that a resistance shunting a motor armature coil or galvanometer coil provides damping action for the motion of said coil. In general, low shunt resistances produce heavy damping; high shunt resistances produce light damping. Heavy damping effects mean slow motion of the armature; heavy damping of a galvanometer means that motion is slow and overshoot is not present when the galvanometer current changes. On the other hand, light damping means fast motion of an armature coil, and fast motion and overshoot in the case of changing current in a galvanometer coil.

In the subject invention, rapid motion of the vanes and therefore of armature coil 148 is desired when a source appears in the field of phototube 25. When an oncoming headlight appears in the field, the phototube 25 and amplifier stages 71, 72, 90, 99, 105 and 117, together with the rectifier and filter circuits connected to grids 125 and 128 cut off tube 124 and place tube 123 in heavy conduction. The voltage drop across armature coil 148 is approximately 30 volts, under such conditions, as is the voltage drop across lamp 149, its resistance being about 2000 ohms for a lamp terminal voltage of 30 volts, while the resistance of inductance 150 is quite low (less than 100 ohms). Thus for large applied voltages, the resistance of lamp 149 is quite high, resulting in light damping and therefore allowing fast motion.

Now let us consider the action of the circuit when the source is actually being tracked, that is, after "pickup." Under such circumstances, the tubes 123 and 124 are in nearly equal conduction, the voltage drops across resistances 151 and 152 are nearly equal, and the voltage across armature coil 148 and hence across lamp 149 is quite low. Under such circumstances, the resistance of lamp 149 is quite low (about 200 ohms) so that the total resistance in lamp 149 and inductance 150 is about 300 ohms. Because of this low shunting resistance, the armature coil 148 has large damping, motion is slow, and the active system has increased stability.

In summary, it has been shown that damping is light when it is desired to have rapid motion, but damping is heavy when the system is tracking, resulting in improved stability under such conditions. Further, the change from light to heavy damping is accomplished automatically. It should be understood that devices other than lamp bulbs may be used, several other devices being known to the art which exhibit the required characteristic of increasing resistance with increasing voltage.

Figure 8:
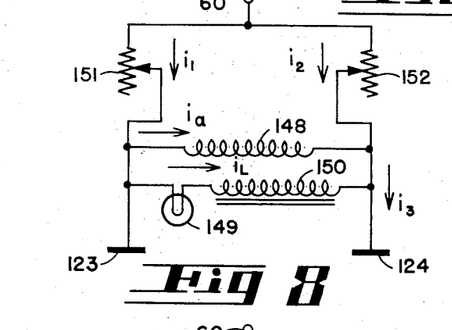

So far, nothing has been said about inductance 150 other than its resistance. Reference will now be made to Figs. 8, 9, 10 and 11. In these figures, Fig. 7 is repeated, with only the anodes of tubes 123 and 124 shown, and with current directions indicated for various conditions. Fig. 8 shows the current directions for the case where no light source is present in the field of lens 10 and the armature coil 148 is in the counterclockwise position against the limit stop. Tube 123 is essentially cut off, so that current $i_1$ is the sum of currents $i_a$ and $i_L$, and current $i_3$ is the sum of currents $i_a$, $i_L$ and $i_2$. It should be understood that current $i_a$ in armature coil 148 in the direction shown in Fig. 8 produces counterclockwise rotation, while current in the opposite direction produces clockwise rotation of the vanes.

Figure 9:
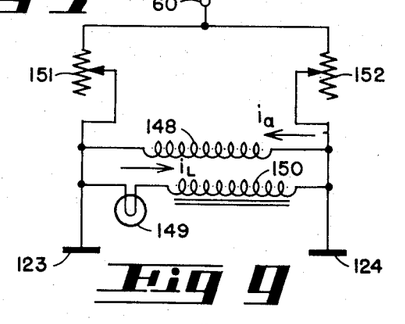
Figure 10:
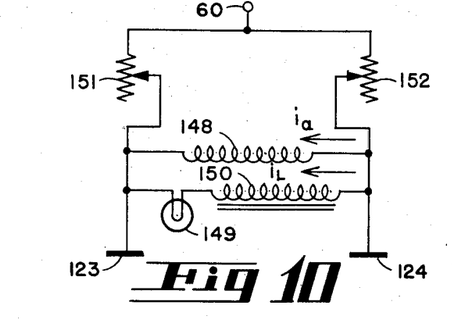

When a source appears in the field, tube 124 is cut off and tube 123 reaches full conduction. Immediately after this occurs, current directions are as shown in Fig. 9. Current $i_L$ continues to flow to the right as taught by Lenz's Law, although normal current directions under such circumstances are as shown in Fig. 10. Current $i_L$ in Fig. 9 has two possible paths: Through armature coil 148 and through resistances 152 and 151 in series.

Consider first that part of current $i_L$ which flows through armature coil 148. It flows to the left, in the direction required to produce clockwise rotation, and therefore aids the acceleration of the vanes 17, 18 and 19, by adding to the current which would otherwise flow in armature coil 148.

Consider next that part of current $i_L$ which flows through resistances 152 and 151 in series. This part of current $i_L$ flows in opposition to the current normally flowing down through resistance 152, and therefore lowers the voltage drop across resistance 152. This same current flows down through resistance 151 adding to its normal current and therefore increases the voltage drop across this resistance. The concurrent effect of these changes in the voltage drops across resistances 152 and 151 from their "normal" values is to increase the voltage drop across armature coil 148, thereby effecting a further increase in the current $i_a$ which would flow under conditions such as those outlined below for Fig. 10. The net result of the two concurrent effects as stated above is to cause a current $i_a$ in the armature coil 148 which is substantially higher immediately after clockwise rotation is required by the system than would occur without inductance 150 being present, and higher than the current $i_a$ flowing after current $i_L$ has reversed its direction to that shown in Fig. 10. Therefore, a large acceleration is given the armature coil 148 and the vanes 17, 18 and 19 connected to it, resulting in increased speed of rotation.

Current $i_L$ in Fig. 9 diminishes to zero and builds up in the opposite direction as shown in Fig. 10, the time required for this change in direction being approximately 15 milliseconds. Fig. 10 therefore represents the conditions obtaining during clockwise rotation after current $i_L$ has reversed and before the opaque portion of the direction finder vane (see Fig. 3 of U.S. Patent No. 2,753,487 to Bone) has shut off the image of an oncoming headlight.

Figure 11:
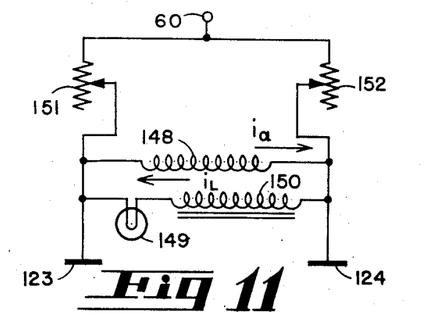

As soon as the opaque portion of the direction finder vane covers the image of the oncoming headlight, the conditions of Fig. 11 will obtain. Current $i_a$ in armature coil 148 has reversed to produce counterclockwise rotation, but current $i_L$ through inductance 150 will not immediately reverse in accordance with Lenz's law. Current $i_L$ flowing to the left has two possible paths: through armature coil 148 and through resistances 151 and 152 in series. The effect of current $i_L$ is in general the same as described above for Fig. 9 except that directions are reversed. That is, that part of current $i_L$ which flows through armature coil 148 increases its current above the normal value, and the changes in voltage drops across resistances 151 and 152 increase the voltage across armature coil 148, effecting a further increase in current $i_a$. It should be understood that in this case the voltage drop across resistance 151 is decreased, while that across resistance 152 is increased. Due to this increased current $i_a$, the acceleration of the armature coil 148 and the vanes 17, 18 and 19 to produce counterclockwise rotation is made higher than it would be without inductance 150 being present.

Current $i_L$ as shown in Fig. 11 now diminishes to zero and increases in the opposite direction so that current directions as shown in Fig. 8 represent conditions obtaining after current $i_L$ has reversed and before the direction finder vane 17 has moved sufficiently far to readmit light to phototube 25. When light is readmitted, the currents as shown in Fig. 9 flow, and the sequence of events proceeds as previously described.

The effect of inductance 150 is therefore to provide for high accelerations of motor armature coil 148 and the vanes 17, 18 and 19. By providing high accelerations, the amplitude of any hunting action is reduced to such a value and the hunting frequency is increased to such a value that the human eye cannot detect any motion of the shadows, cast by the direction finder vanes, other than that required by the motion of oncoming headlamps.

It should be understood that satisfactory operation is possible with a "hunting" system provided that the hunting amplitude is low and hunting frequency is high. Furthermore, certain combinations of component values will produce a completely stable system in which no hunting occurs. In a linear system, the optimum value of the inductance 150 is that value which causes the ratio of the amplitude of vane motion to the amplitude of the input to the amplifier to be smallest when the angle of this ratio is 180 degrees. For a non-linear system, the optimum value of inductance 150 is that value which causes the ratio of the amplitude of vane motion to the amplitude of the input to the linear part of the amplifier to be smallest when the angle of this ratio is equal to the angle of the negative reciprocal of the describing function for the non-linear part of the system.

While there has been shown and described what is at present considered to be the preferred embodiment of the present invention, it will be understood that various modifications and changes may be made therein without departing from the true scope of the invention as defined in the appended claims.

I claim:

1. In an automatic vehicle headlighting system of the type including photosensitive signaling means and in which synchronized shadow casting and bearing indicating vanes are angularly positioned by signals from such means in accordance with the relative bearing of a light source constituted by the headlamp of an opposing vehicle, the improvement which comprises: reversible electromagnetic means including a winding for positioning at least one of the vanes in accordance with such bearing, said winding having two terminals, amplifying means between the photosensitive means and said terminals for energizing said winding, and a non-linear shunt element in circuit between said terminals, said shunt element being of the type in which resistance increases with applied voltage increase, said shunt element having a high resistance when the voltage between said terminals is high, to increase the speed of response of the vanes, and a low resistance when said voltage is low, to provide heavy damping when the vanes are tracking an oncoming vehicle.

2. The combination in accordance with claim 1 in which the amplifier means includes a pair of output tubes, one tube being coupled to one terminal of said winding to drive the vanes in one direction, and the other tube being coupled to the other terminal of said winding to drive the vanes in the opposite direction, a power supply having terminals in series with said tubes, said tubes being arranged in D.C. parallelism with relation to the supply, and adjustable resistors in series between said power supply and said tubes.

3. The combination in accordance with claim 2 in which the non-linear shunt element is a tungsten light bulb.

4. In an automatic vehicle headlighting system of the type including photosensitive signaling means and in which synchronized shadow casting and bearing indicating vanes are angularly positioned by signals from such means in accordance with the relative bearing of a light source constituted by the headlamp of an opposing vehicle, the improvement which comprises: reversible electromagnetic means including a winding for positioning at least one of the vanes in accordance with such bearing, said winding having two terminals, amplifying means between the photosensitive means and said terminals for energizing said winding, and an inductance in shunt across said terminals and proportioned to accelerate the response of the vanes immediately upon reversal thereof.

5. A linear system in accordance with claim 4 in which the value of said inductance is that value which causes the ratio of the amplitude of vane motion to the amplitude of the input of the amplifying means to be smallest when the angle of this ratio is 180 degrees.

6. A non-linear system in accordance with claim 4 in which the value of the inductance is that value which causes the ratio of the amplitude of vane motion to the amplitude of the input to the linear portion of the amplifying means to be smallest when the angle of this ratio is equal to the angle of the negative reciprocal of the describing function for the non-linear part of the system.

7. The combination in accordance with claim 4 in which there is disposed in series with said inductance and between said terminals a non-linear shunt having a high resistance when the voltage between the terminals is high and a low resistance when said voltage is low.

8. In an automatic vehicle headlighting system of the type including photosensitive means and in which synchronized shadow casting and bearing indicating vanes are angularly positioned by signals from such means in accordance with the relative bearing of a light source constituted by the headlamp of an opposing vehicle, the improvement which comprises: reversible electromagnetic means including a winding for positioning at least one of the vanes in accordance with such bearing, said winding having two terminals, amplifying means between the photosensitive means and said terminals and having output tubes separately anode-coupled to said terminals for energizing said winding, an inductance in circuit between said terminals proportioned to accelerate the response of the vanes immediately upon reversal thereof, a non-linear shunt element in series with said inductance and between said terminals, a source of anode voltage, and resistors between said terminals and the anodes of said tubes, said shunt element being of the type in which resistance increases with applied voltage increase.

9. In a vehicle headlighting system of the type including a photoelectric signaling system and a headlamp automatically controlled by said system to assume a normal driving condition or a condition protective of an oncoming vehicle, the improvement comprising, in combination: sensing relay means actuated when an oncoming vehicle is within pick-up range, and means including a foot switch controlled by the sensing relay means for putting the headlamp into the "search" condition protective of an oncoming vehicle when the sensing relay means has not been actuated, said means further comprising a search relay and an artificial light source in proximity to the photosensitive element of the photoelectric system and circuit means controlled by the search relay for energizing said light source.

10. In a vehicle headlighting system of the type including a photoelectric signaling system, having an input and output and cascaded stages, and a headlamp automatically controlled by said system to assume a normal driving condition or a condition protective of an oncoming vehicle, the improvement comprising, in combination: sensing relay means actuated when an oncoming vehicle is within pick-up range, and contact means controlled by the sensing relay means for uncoupling at least the output stages of the signaling system when the sensing relay means has not been actuated.

11. In a vehicle headlighting system of the type which includes a photoelectric signaling system, comprising a photosensitive element and cascaded amplifier stages, and a headlamp having a vane automatically controlled by the signaling system to assume, in the absence of input signals, a normal driving or flash position, or, in the presence of input signals, a search position protective of an oncoming vehicle, the improvement comprising, in combination, a sensing relay coupled to the signaling system and energized by the presence of signals to indicate when an oncoming vehicle is within pickup range, a source of bias potential adapted to be coupled to the signaling system to put the vane in the flash position, first contacts included in the sensing relay means and a manually operative foot switch connected in series between said source and said channel and adapted when closed to apply said bias to said channel, said first contacts being closed when the sensing relay means is energized, search relay means adapted to be energized to put the vane into the search condition, and means comprising second contacts controlled by the sensing relay and in series with said foot switch for deenergizing the search relay means when the sensing relay means is energized, said second contacts being closed and the first set of contacts being opened when the sensing relay is deenergized.

References Cited in the file of this patent
UNITED STATES PATENTS

| | | |
|---|---|---|
| 1,757,193 | Hotopp | May 6, 1930 |
| 2,807,752 | McIlvaine | Sept. 24, 1957 |
| 2,917,666 | Engelmann et al. | Dec. 15, 1959 |